US005512125A

United States Patent [19]

Momot et al.

[11] Patent Number: 5,512,125

[45] Date of Patent: Apr. 30, 1996

[54] MAGNETIC MARKER APPLYING DEVICE FOR A PRINTING PRESS

[76] Inventors: Stanley Momot, 6405 Laurel Ave., La Grange, Ill. 60525; Richard Oesterlin, 814 Quincy Ave., Hinsdale, Ill. 60521; Edward Hudyma, 631 Derbyshire La.; Kenneth Dabisch, 216 Flaggstaff Dr., both of Bolingbrook, Ill. 60440; Richard Fedrigon, 935 Ontario St., Oak Park, Ill. 60302; Ira Goldberg, 54 Westbury Ct., Thousand Oaks, Calif. 91360; Ragy Isaac, 895 Brampton Cir., Bolingbrook, Ill. 60440

[21] Appl. No.: 295,128

[22] Filed: Aug. 24, 1994

[51] Int. Cl.[6] .................... B32B 31/10

[52] U.S. Cl. .................... 156/353; 156/272.4; 156/542; 156/552; 156/584; 335/219; 335/291

[58] Field of Search .................... 156/344, 353, 156/584, 542, 552, 272.4; 335/219, 291

[56] References Cited

U.S. PATENT DOCUMENTS

| | | | |
|---|---|---|---|
| 4,980,010 | 12/1990 | Ellis et al. | 156/292 |
| 5,017,262 | 5/1991 | Riesing | 156/552 X |
| 5,122,216 | 6/1992 | Goodwin, III | 156/552 X |
| 5,296,080 | 3/1994 | Merkatoris et al. | 156/552 X |
| 5,337,110 | 8/1994 | Dowe | 335/219 X |

FOREIGN PATENT DOCUMENTS

| | | | |
|---|---|---|---|
| 1302259 | 4/1987 | U.S.S.R. | 335/291 |

*Primary Examiner*—Mark A. Osele

[57] ABSTRACT

A marker applying device (50) for a substrate (14) having a plurality of markers (70) having magnetic material (74) in a backing (72) of the markers (70), and an adhesive (76) on a front surface (78) of the backing (72), a marker retainer (62) having a relative weak magnetic force at spaced locations (64) for releasably retaining the markers (70) at the spaced locations (64) in a configuration with the adhesive (76) facing outwardly from the retainer (62), an electromagnet (88) positioned with the substrate (14) being intermediate the electromagnet (88) and retainer (62), and the markers (70) being sequentially positioned by the retainer (62) in a configuration with the adhesive (76) facing the electromagnet (88) and substrate (14), and a device (CPU) for electrically pulsing the electromagnet (88) to produce a relatively strong magnetic force, such that the electromagnet (88) removes the markers (70) from the retainer (62) and deposits them onto the substrate (14) such that the adhesive (76) on the markers (70) retains the markers (70) on the substrate (14).

16 Claims, 5 Drawing Sheets

MAGNETIC MARKER APPLYING DEVICE FOR A PRINTING PRESS

BACKGROUND OF THE INVENTION

The present invention relates to marker applying devices which may be used in a printing press.

In the past, printing presses have been used to form a printed image on a web. After printing, the web is cut into segments, and the resulting signatures are folded into the product printed for the consumer.

Typically, the cutter for the press has been manually adjusted in order to sever the web at a desired location. On occasions, however, the location where the web is severed may go out of synchronism relative to the press, and may occur even in the printed image area, resulting in a faulty printed product causing waste of the faulty product, and causing inconvenience to the press operator who must readjust the cutting device relative to the web.

SUMMARY OF THE INVENTION

A principal feature of the present invention is the provision of a marker applying device which may be used in a printing press which produces a printed web.

The applying device of the present invention comprises, a rotatable disc having spaced locations of relatively weak permanent magnets, a plurality of markers having magnetic material in a backing of the markers, and an adhesive on the front surface of the backing, a release sheet releasably retaining the markers by the adhesive on the release sheet, means for removing the markers from the release sheet and placing the removed markers on the spaced magnetized locations of the disc in a configuration with the backing facing the magnetized locations and the adhesive facing outwardly from the disc, an electromagnet producing a relatively strong magnetic force compared to the magnetized locations, with the markers sequentially facing the electromagnet in a configuration with the web being located intermediate the disc and electromagnet, means for electrically pulsing the electromagnet such that the pulsed electromagnet removes the markers from the disc and deposits the removed markers on the web such that they are retained by the adhesive on the web, means for sequentially rotatably driving the disc in synchronism with the pulsation of the electromagnet such that the markers are sequentially placed by the disc in a configuration facing the electromagnet preparatory to removing the markers from the disc, and a cutting device to sever the web.

A feature of the present invention is the provision of means for sensing the location of the markers on the web downstream from the applying device.

Another feature of the present invention is the provision of means responsive to the sensing means for adjusting the web to synchronize the web with the cutting device.

A further feature of the present invention is that the device may sense the rotational position of a cylinder of the press, and actuate the applying device responsive to the sensing device for the cylinder.

Thus, a feature of the invention is that the web is automatically synchronized relative to the cutting device.

A further feature of the invention is that the applying device provides cutting of the web in an improved and consistent manner.

Still another feature of the invention is that the device minimizes the possibility of waste of the cut web, and enhances convenience to the operators of the press.

Further features will become more fully apparent in the following description of the embodiments of this invention, and from the appended claims.

DESCRIPTION OF THE PREFERRED EMBODIMENTS

Figure 1:
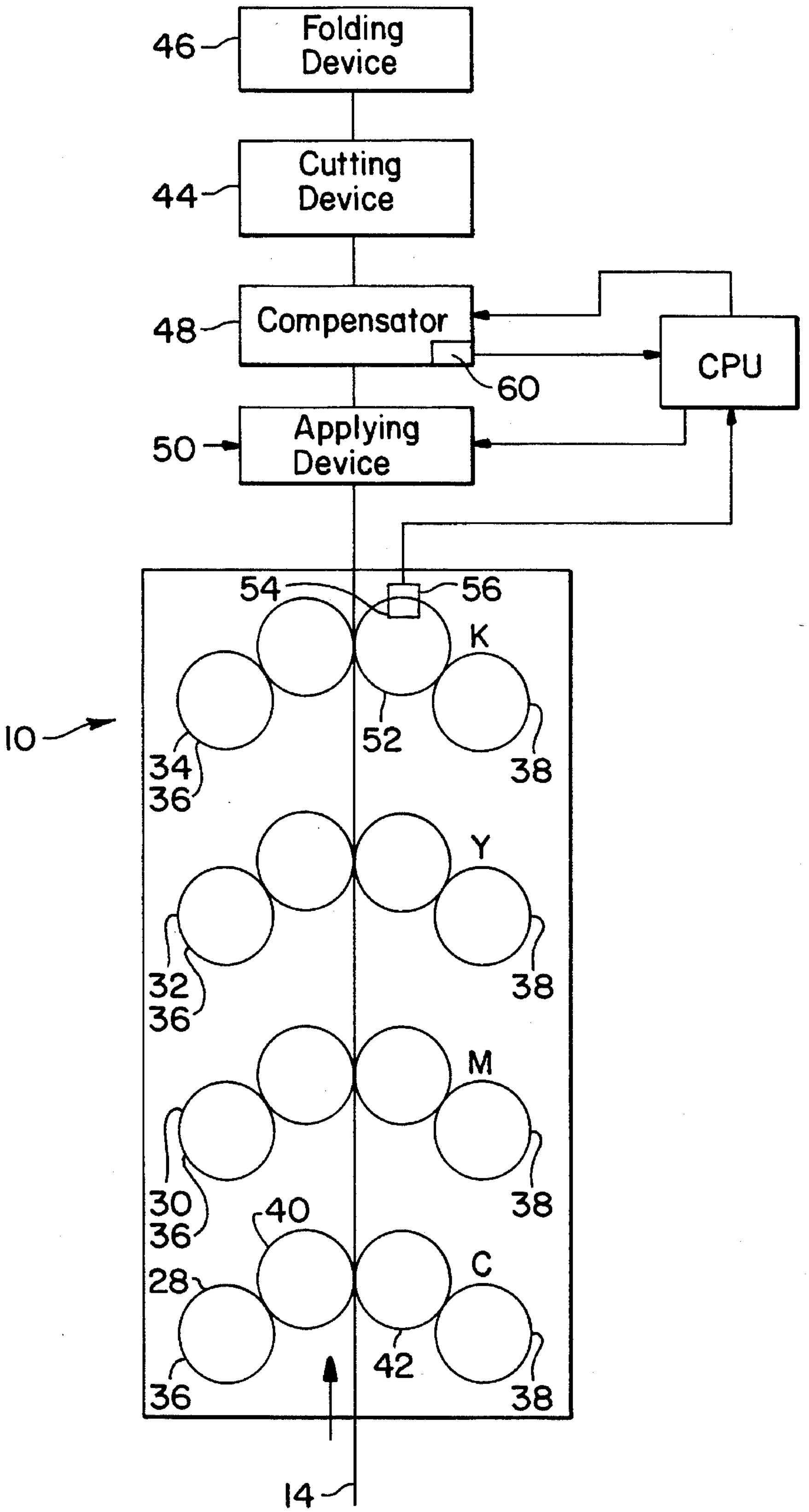
FIG. 1 is a diagrammatic view of a press and marker applying device of the present invention.

Although the marker applying device of the present invention will be disclosed in connection with a printing press, it should be understood that the device may be used in any other suitable apparatus or machine, such as a label applying device. Referring now to FIG. 1, there is shown a printing press generally designated 10 for printing an image on a paper web 14. The press 10 has a plurality of printing units 28, 30, 32, and 34 for printing different colors of ink on the web 10. As shown, the printing unit 28 may print an ink having a color Cyan C, the printing unit 30 may print an ink having a color Magenta M, the printing unit 32 may print an ink having the color Yellow Y, and the printing unit 34 may print an ink having a color black K in a four-color press 10.

The printing units 28, 30, 32, and 34 each have a plurality of print rolls or cylinders 36 associated with a blanket cylinder or roll 40. During printing by the press 10, an image of the ink is transferred from the print rolls 36 to the associated blanket rolls 40 to print the image on one surface of the web 14. In addition, the press 10 may have a plurality of printing units having a plurality of print rolls 38 associated with a plurality of blanket rolls or cylinders 42 on an opposed side of the web 14 in order to transfer the ink image from the print rolls 38 to the blanket rolls 42 for printing an image on the other surface of the web 14. The following description of the print rolls is equally applicable to either the print rolls 36 or the print rolls 38 on the opposed sides of the web 14.

As shown, the press 10 may have a marker applying device generally designated. 50 located downstream from the printing units 28–34, a cutting device or cutter 44 of known type located downstream from the applying deice 50 for sequentially severing the web 14, a folding device of known type 46 for folding the signatures formed by the cutting device 44, and a compensator 48 of known type for adjusting the web 14 relative to the cutting device 44.

Any one of the cylinders 43 (labeled 52 in FIG. 1) may have a permanent magnet 54 embedded at a known location, such as at the gap of a blanket or plate, adjacent the outer surface of the cylinder 52, and an associated sensor 56 for determining when the magnet 54 is located adjacent the sensor 56. In turn, the sensor 56 supplies a signal to a Central Processing Unit (CPU) 58, having a Read Only Memory (ROM) and a Random Access Memory (RAM) when, the magnet 54 and sensor 56 are aligned. The signal supplied by the sensor 56 is utilized to synchronize the web 14 to the cutting device 44, as will be seen below. For this purpose, a sensor 60 is associated with the compensator 48 in order to sense the location of a marker 70 as the web 14 passes to the cutting device 44, as will also be seen below. In turn, the compensator 48 synchronizes the web 14 to the cutting device 44.

Figure 2:
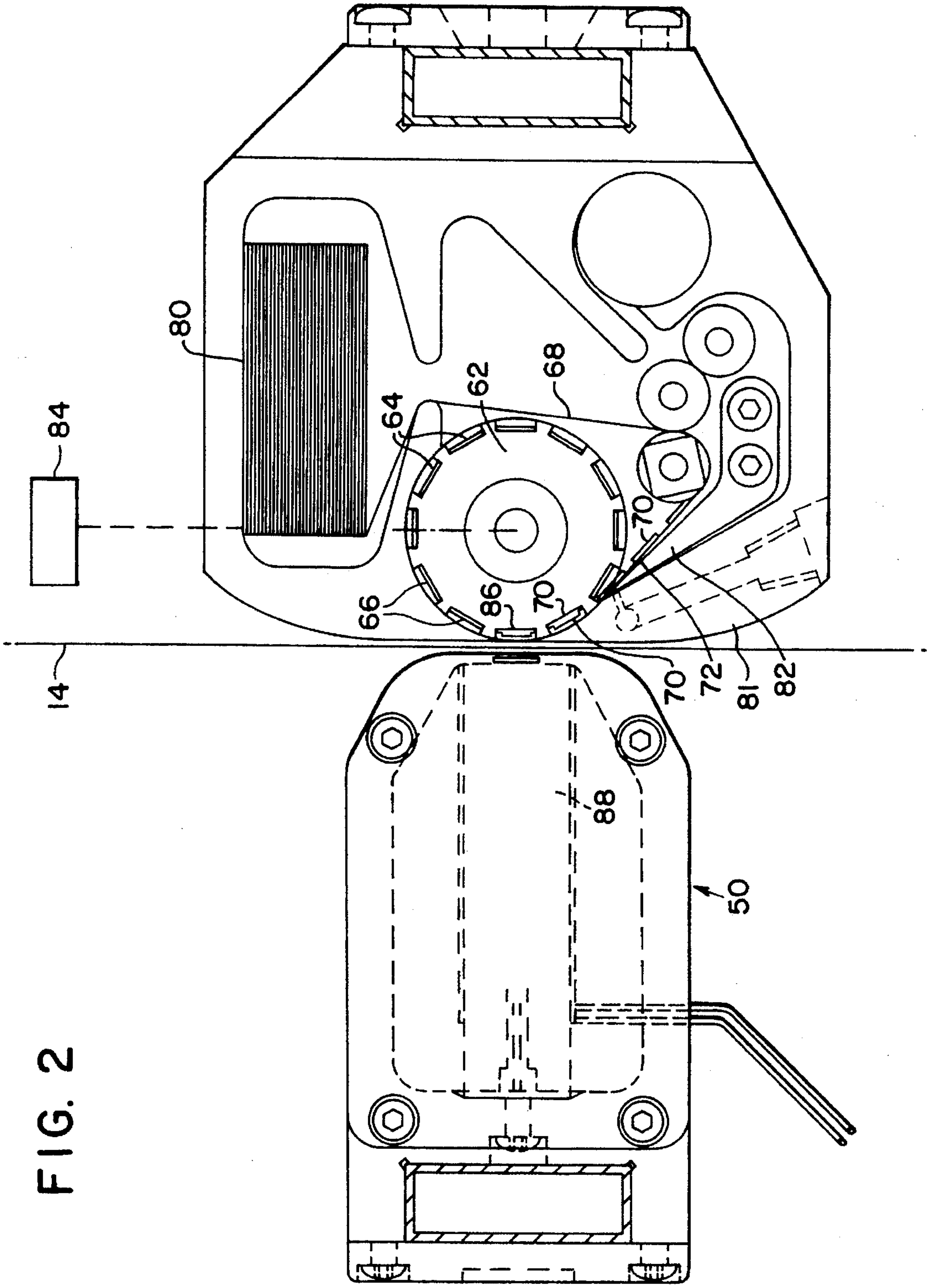
FIG. 2 is a plan view of the marker applying device of the present invention.
Figure 3:
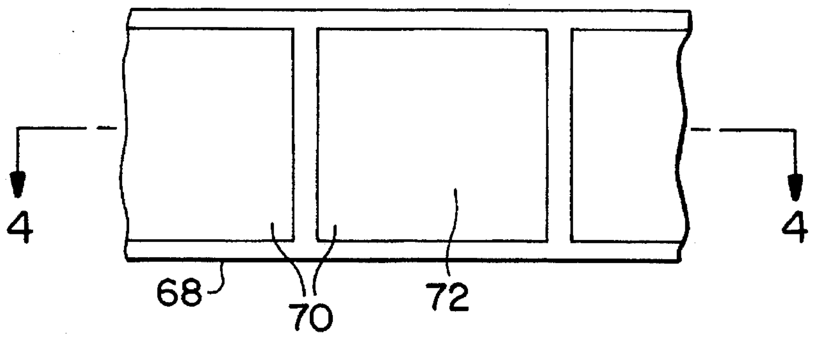
FIG. 3 is a fragmentary plan view of markers retained on a release sheet.
Figure 4:
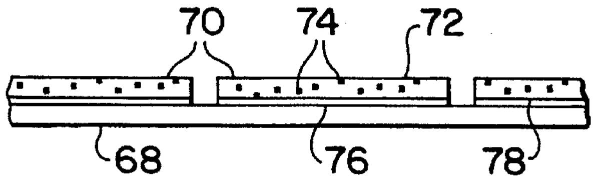
FIG. 4 is a sectional view taken substantially as indicated along the line 4—4 of FIG. 3.

With reference to FIG. 2, the marker applying device 50 has a rotatable disc 62 having spaced locations 64 around the periphery of the disc 62 having a plurality of relatively weak permanent magnets 66 at the locations 64. As shown in FIGS. 2–4, the device 50 has an elongated release sheet 68 having a plurality of spaced markers 70 disposed along the release sheet 68. The markers 70 have a backing 72 having magnetic particles 74 embedded in the backing 72, and a pressure-sensitive adhesive 76 on a front surface 78 of the backing 72. As shown in FIG. 2, the release sheet 68 and unused markers 70 are supplied in a stack 80 in a configuration of reduced dimensions.

As shown, the stack 80 of markers is unstacked, and the release sheet 68 passes to the disc 62 where the release sheet is passed around a peel plate 82 in order to remove the markers 70 from the release sheet 68, and the release sheet 68 is then removed from the applying device 50 for disposal. At the same time, the markers 70 are removed from the release sheet 68, and are passed to the magnets 66 by a blower 81 which blows air against the markers 70 such that the markers are releasably retained on the magnets 66 by the magnetized backings 72 of the markers 70 in a configuration with each spaced magnet 66 retaining a marker 70 with the adhesive 76 facing outwardly from the disc 62.

The applying device 50 has a stepper motor 84 for sequentially rotatably driving the disc 62 until the markers 70 are sequentially placed at an applying position 86 facing an electromagnet 88, with the web 14 being located intermediate the electromagnet 88 and the markers 70 being retained by the magnets 66. When it is desired to apply the markers 70 to the web 14, the electromagnet 88 is pulsed with electrical current from the CPU, such that the electromagnet 88 produces a temporary relatively large magnetic force, thus removing the markers 70 from the disc 62 where the markers were retained with a magnetic force much less than the magnetic force supplied by the electromagnet 88. In turn, the markers 70 are sequentially retained on the web 14 by the adhesive 76 of the markers 70 at spaced locations as synchronized by the press 10 and device 50.

Figure 6:
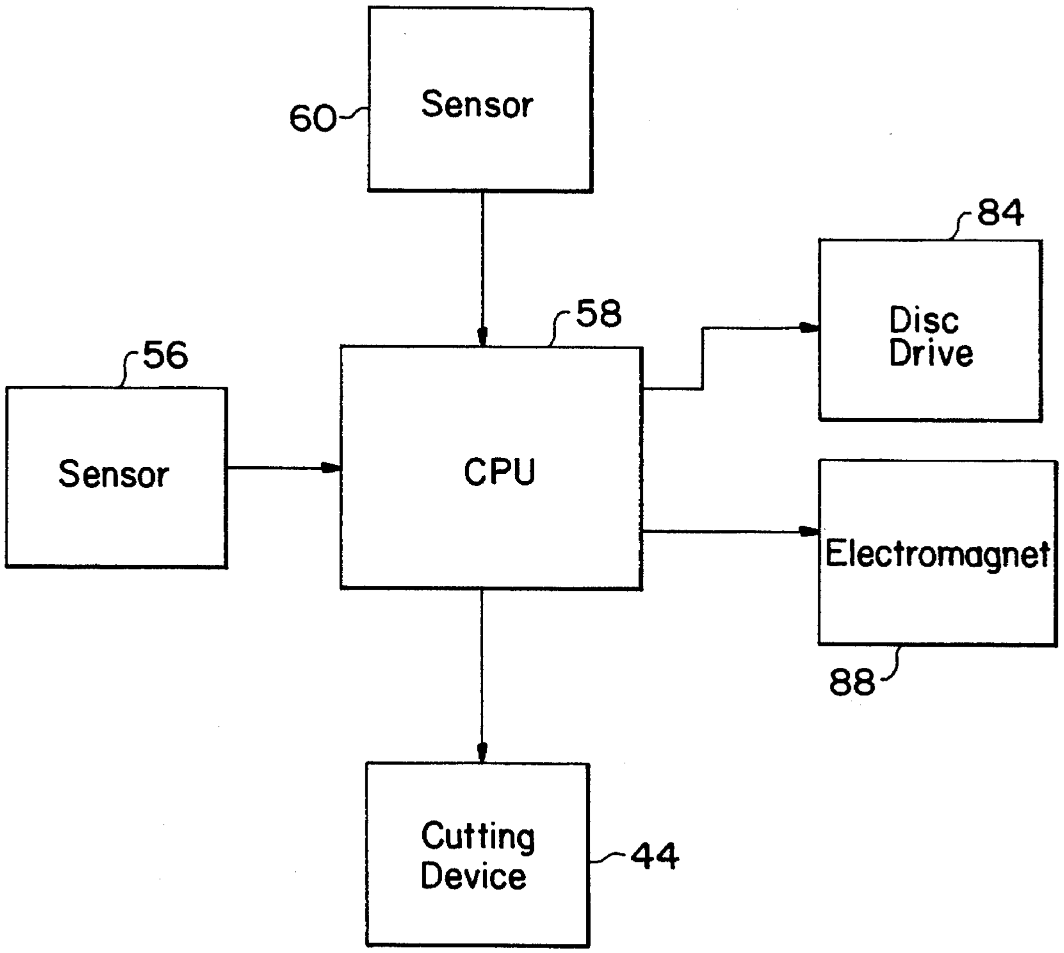
FIG. 6 is a block diagram for showing operation of the applying device of the present invention.
Figure 7:
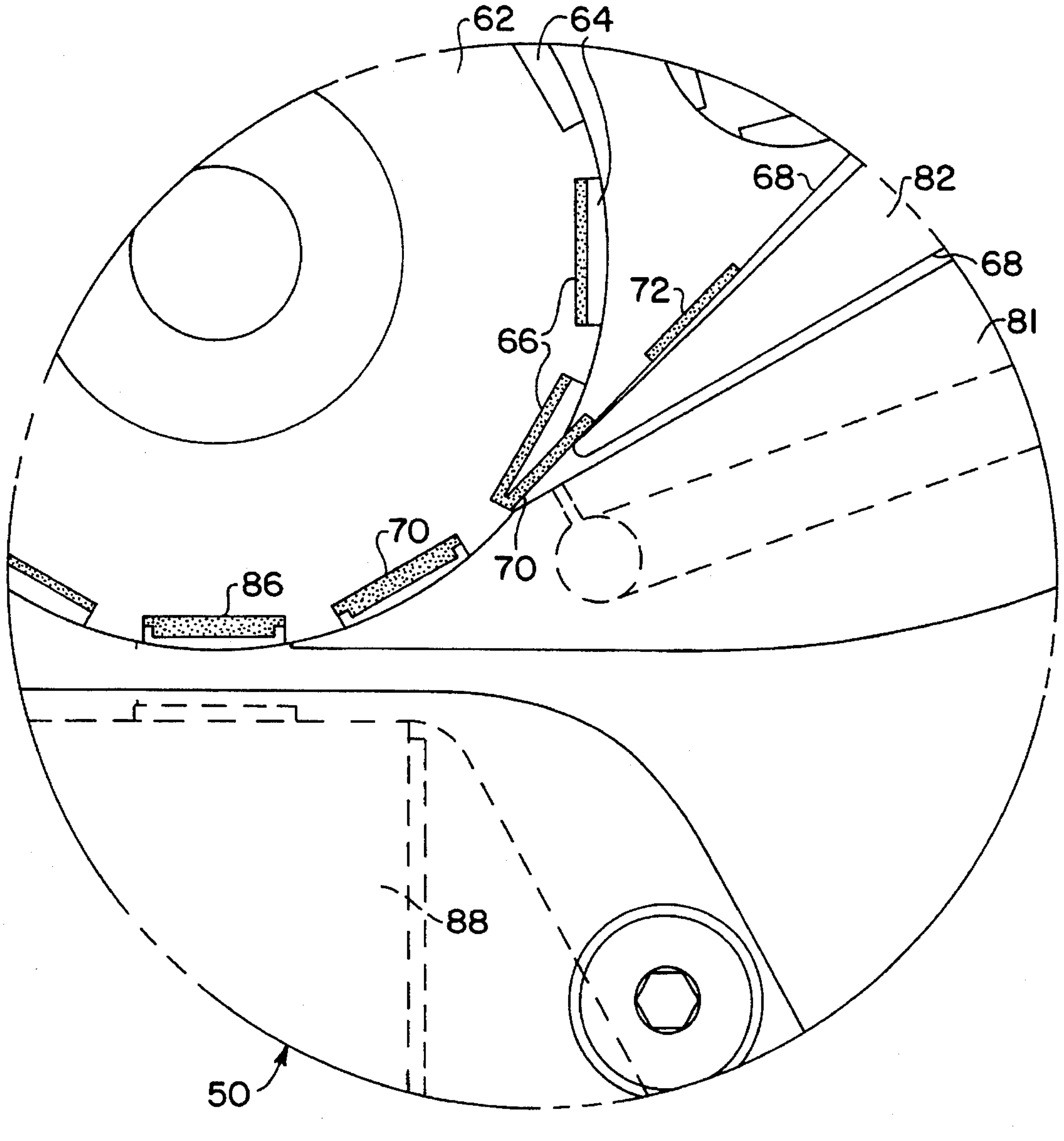
FIG. 7 in an enlarged plan view of the marker applying device of FIG. 2.

With reference to FIGS. 1, 2, and 6, when the cylinder sensor 56 senses that associated magnet 54 is at a known rotational position of the cylinder 52, a signal is supplied to the CPU. In turn, the CPU generates a signal or pulse which is applied to the electromagnet 88 in order to place a marker 70 on the web 14, and after a predetermined delay, the CPU actuates the stepper motor 84 in order to position the next marker 70 in a configuration facing the electromagnet 88.

After application of the markers 70 at spaced and timed locations on the web 14, the marked web 14 moves to the compensator 48 where the sensor 60 is positioned to sequentially sense the markers 70 on the web 14, at which time the sensor 60 supplies a signal to the CPU. In turn, the CPU causes synchronization of the web 14 through the compensator 48 to the cutting device 44.

In this manner, the cutting of signatures of the web 14 is synchronized to the rotational position of the cylinder 52. The applying device 50 thus eliminates manual adjustments otherwise required by operators of the press, and also minimizes waste otherwise caused by severance of the web at incorrect positions.

Figure 5:
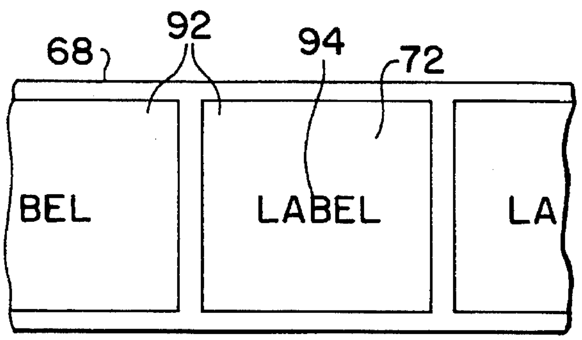
FIG. 5 is a fragmentary plan view of labels which may be used in the applying device.

As shown in FIG. 5 the markers 70 may comprise labels 92 having indicia 94 on a front surface of the labels 92. Hence, the marking device 50 may be utilized to apply labels 92 in an environment completely different from a printing press. In other respects, the marking or label applying device 50 would operate in the same manner in applying labels to some form of sheet or web.

The foregoing detailed description is given for clearness of understanding only, and no unnecessary limitations should be understood therefrom, as modifications will be obvious to those skilled in the art.

What is claimed is:

1. A marker applying device for a substrate, comprising:

a plurality of markers having magnetic material in a backing of the markers, and an adhesive on a front surface of the backing;

a marker retainer having a relatively weak magnetic force at spaced locations for releasably retaining the markers at the spaced locations in a configuration with the adhesive facing outwardly from the retainer;

an electromagnet positioned with the substrate being intermediate the electromagnet and retainer, and the markers being sequentially positioned by the retainer in a configuration with the adhesive facing the electromagnet and substrate; and means for electrically pulsing the electromagnet to produce a relatively strong magnetic force, such that the electromagnet removes the markers from the retainer and deposits them onto the substrate such that the adhesive on the markers retains the markers on the substrate.

2. The device of claim 1 wherein the markers comprise labels having indicia on an outer surface of the backing.

3. The device of claim 1 wherein the retainer comprises a rotatable disc having the spaced locations of weak magnetic force disposed around the periphery of the disc.

4. The device of claim 3 including means for rotatably driving the disc, and means for periodically actuating the driving means in synchronism with the pulsed electromagnet.

5. The device of claim 4 including means for delaying actuation of the driving means after pulsation of the electromagnet.

6. The device of claim 1 wherein the markers are releasably retained on an elongated release sheet.

7. The device of claim 6 including means for passing the release sheet to the retainer, and means for removing the markers from the release sheet and placing the removed markers on the spaced locations of the retainer.

8. The device of claim 7 wherein the release sheet is retained in a roll.

9. The device of claim 7 including a peel plate positioned adjacent the retainer to remove the markers from the release sheet, and cause the relatively weak magnetic force at the spaced locations to attract the backing of the markers and releasably retain the markers on the retainer.

10. The device of claim 1 including a printing press, in which the markers are applied by the device on a web of the press, including sensing means to actuate the electromagnet in synchronism with the press, and a cutting device for cutting the web, and means for sensing the marker and actuating the cutter in order to sever the web at a desired location.

11. A marker applying device for a printing press producing a printed web, comprising:

a rotatable disc having spaced locations of relatively weak permanent magnets;

a plurality of markers having magnetic material in a backing of the markers, and an adhesive on the front surface of the backing;

a release sheet releasably retaining the markers on the release sheet by the adhesive;

means for removing the markers from the release sheet and placing the removed markers on the spaced magnetized locations of the disc in a configuration with the backing facing the magnetized locations and the adhesive facing outwardly from the disc;

an electromagnet producing a relatively strong magnetic force compared to the magnetized locations, with the markers sequentially facing the electromagnet in a configuration with the web being located intermediate the disc and electromagnet;

means for electrically pulsing the electromagnet such that the pulsed electromagnet removes the markers from the disc and deposits the removed markers on the web such that they are retained on the web by the adhesive;

means for sequentially rotatably driving the disc in synchronism with the pulsation of the electromagnet such that the markers are sequentially placed by the disc in a configuration facing the electromagnet preparatory to removing the markers from the disc;

a cutting device to sever the web;

means for sensing the location of the markers of the passing web; and means responsive to the sensing means for synchronizing the web to the cutting device.

12. The device of claim 11 wherein the removing means comprises a peel plate positioned to remove the markers from the release sheet such that the magnetized locations on the disc retain the markers.

13. The device of claim 11 including means for delaying the disc driving means subsequent to pulsation of the electromagnet.

14. The device of claim 11 including a rotatable cylinder, means for sensing a specified rotational position of the cylinder, and including means for pulsing the electromagnet responsive to the sensing means.

15. The device of claim 11 wherein the release sheet and retained markers are wound into a roll.

16. A marker applying device for a substrate, comprising:

a plurality of markers having magnetic material in the markers, and an adhesive on a surface of the markers;

means for sequentially positioning the markers at an actuating location;

an electromagnet positioned with the substrate being intermediate the electromagnet and positioning means, with the markers being sequentially positioned by the positioning means in a configuration with the adhesive facing the electromagnet and substrate; and means for electrically pulsing the electromagnet to produce a magnetic force, such that the electromagnet deposits the markers on the substrate such that the adhesive on the markers retains the markers on the substrate.

* * * * *